US012793375B2

(12) United States Patent
Forney et al.

(10) Patent No.: US 12,793,375 B2
(45) Date of Patent: Nov. 10, 2026

(54) METHODS AND SYSTEMS FOR AVOIDING BUILDINGS AND OTHER STRUCTURES IN MOSAIC SEAMLINES USING SEMANTIC SEGMENTATION

(71) Applicant: VANTOR INC., Westminster, CO (US)

(72) Inventors: Elliott Forney, Westminster, CO (US); Matthew W. Stackpole, Westminster, CO (US); Stephen Ng, Westminster, CO (US); Timothy Harris, Westminster, CO (US); Richard Clelland, Westminster, CO (US); Rachel Cox, Westminster, CO (US)

(73) Assignee: VANTOR INC., Westminster, CO (US)

( * ) Notice: Subject to any disclaimer, the term of this patent is extended or adjusted under 35 U.S.C. 154(b) by 138 days.

(21) Appl. No.: 18/732,768

(22) Filed: Jun. 4, 2024

(65) Prior Publication Data

US 2025/0371838 A1 Dec. 4, 2025

(51) Int. Cl.

| | |
|---|---|
| ***G06V 10/26*** | (2022.01) |
| ***G06T 3/4038*** | (2024.01) |
| ***G06V 10/44*** | (2022.01) |
| ***G06V 10/74*** | (2022.01) |
| ***G06V 20/10*** | (2022.01) |
| ***G06V 20/70*** | (2022.01) |

(52) U.S. Cl.

CPC ............ *G06V 10/26* (2022.01); *G06T 3/4038* (2013.01); *G06V 10/44* (2022.01); *G06V 10/761* (2022.01); *G06V 20/176* (2022.01); *G06V 20/70* (2022.01)

(58) Field of Classification Search

CPC ...... G06V 10/26; G06V 10/44; G06V 10/761; G06V 20/176; G06V 20/70; G06T 3/4038

See application file for complete search history.

(56) References Cited

PUBLICATIONS

Dornaika, Fadi et al. "Building Detection from Orthophotos Using a Machine Learning Approach: An Empirical Study on Image Segmentation and Descriptors." Expert systems with applications 58 (2016): 130-142. Web. (Year: 2016).*

Wang, Dongliang et al. "Using Vector Building Maps to Aid in Generating Seams for Low-Attitude Aerial Orthoimage Mosaicking: Advantages in Avoiding the Crossing of Buildings." ISPRS journal of photogrammetry and remote sensing 125 (2017): 207-224. Web. (Year: 2017).*

Li et al. "Optimal Seamline Detection for Orthoimage Mosaicking by Combing Deep Convolutional Neural Network and Graph Cuts", Remote Sensing, 2017, vol. 9, 701.

(Continued)

*Primary Examiner* — John R Wallace

(74) *Attorney, Agent, or Firm* — Harness, Dickey & Pierce, P.L.C.

(57) ABSTRACT

Methods and systems for avoiding buildings and other structures using semantic segmentation, the method including obtaining a plurality of image strips of a geographic location, identifying one or more structures that are present in one or more image strips, and generating one or more seamlines between adjacent image strips using a machine learning model. When two or more adjacent image strips include one or more structures, the method includes circumventing the one or more structures with the generated seamlines therebetween, wherein the generated one or more seamlines form a visual connection between the adjacent image strips.

9 Claims, 6 Drawing Sheets

(56) References Cited

PUBLICATIONS

Shunta, Saito. “Seamline Determination Based on Semantic Segmentation for Aerial Image Mosaicking,” IEEE Access, 2016, vol. 3, pp. 2847-2856.

LuxCarta R&D Team. “Operational pipeline for large-scale 3D reconstruction of buildings from satellite images,” LuxCarta Blog, Oct. 15, 2020.

* cited by examiner

METHODS AND SYSTEMS FOR AVOIDING BUILDINGS AND OTHER STRUCTURES IN MOSAIC SEAMLINES USING SEMANTIC SEGMENTATION

BACKGROUND

Examples of the disclosure generally relate to processing of digital imagery and, in particular, to the processing of digital geospatial imagery to generate geospatial image mosaics.

SUMMARY

In one aspect of the present disclosure, a method for avoiding building structures using semantic segmentation includes obtaining a plurality of image strips of a geographic location, identifying one or more structures that are present in any of the plurality of image strips by using a machine learning model, generating one or more seamlines between adjacent image strips, and when two or more adjacent image strips include one or more structures, circumventing the one or more structures with the generated seamlines therebetween, wherein the generated one or more seamlines form a visual connection between the adjacent image strips.

In an example, the method further includes forming an image mosaic of the geographic location by blending the plurality of image strips at the generated one or more seamlines. In another example, generating the one or more seamlines includes labeling each pixel of the adjacent image strips as structure pixels and non-structure pixels, and identifying a pixel in an image strip that is similar to a pixel in the adjacent image strip. In yet another example, labeling each pixel of the adjacent image strips as structure pixels and non-structure pixels includes performing semantic segmentation. For example, using semantic segmentation includes relying upon a machine learning model. In another example, training labels of the machine learning model are corrected for off-nadir angle by extrapolating a location of a rooftop of the structure based on the location of the footprint and metadata of the image strip, defining a contour of the structure from the footprint to the rooftop thereof, and labeling each pixel within the defined contour as a structure pixel.

In another example, extrapolating the location of the rooftop includes determining a height of the rooftop by receiving a height, a location and an angle of an image capturing device configured to obtain the plurality of image strips, receiving a height of the structure, receiving a height of a ground on which the structure sits, and determining the location of the rooftop based on at least one of the received height, location and angle of the image capturing device, the received height of the structure, and the received height of the ground. In yet another example, the method further includes labeling each pixel outside of the defined contour as a non-structure pixel.

In an example, identifying similar pixels includes computing a cost matrix for the adjacent image strips in an area of overlap of the adjacent image strips, identifying the similar pixels based on the computed cost matrix, and determining a desired cost path based on the identified similar pixels. In a further example, computing the cost matrix includes computing a pixelwise distance score between the adjacent image strips and a structure score. For example, determining the desired cost path includes determining a minimum cost path. In further examples, computing the cost matrix includes determining a distance score between pixels of adjacent image strips in the area of overlap, determining a structure score, combining the distance score and the structure score to generate a combined score, and selecting the pixels of adjacent image strips having a lower combined score, wherein the desired cost path includes the selected pixels. For example, the desired cost path includes a lowest cost path.

In other examples, determining the distance score between the pixels includes determining a difference in color and a difference in intensity between the pixels, the distance being based on the color difference and the intensity difference between the pixels. In a further example, determining the distance score between the pixels includes determining the distance for each of green pixels, red pixels and blue pixels of the adjacent image strips. In another example, the one or more structures include at least one of a building, a bridge, a road, and a body of water. In yet another example, identifying the one or more structures that are present in any of the plurality of image strips includes identifying one or more structures that are common to the plurality of image strips.

The details of one or more techniques are set forth in the accompanying drawings and the description below. Other features, objects, and advantages of these techniques is apparent from the description, drawings, and claims.

Figures 1A, 1B, 1C:
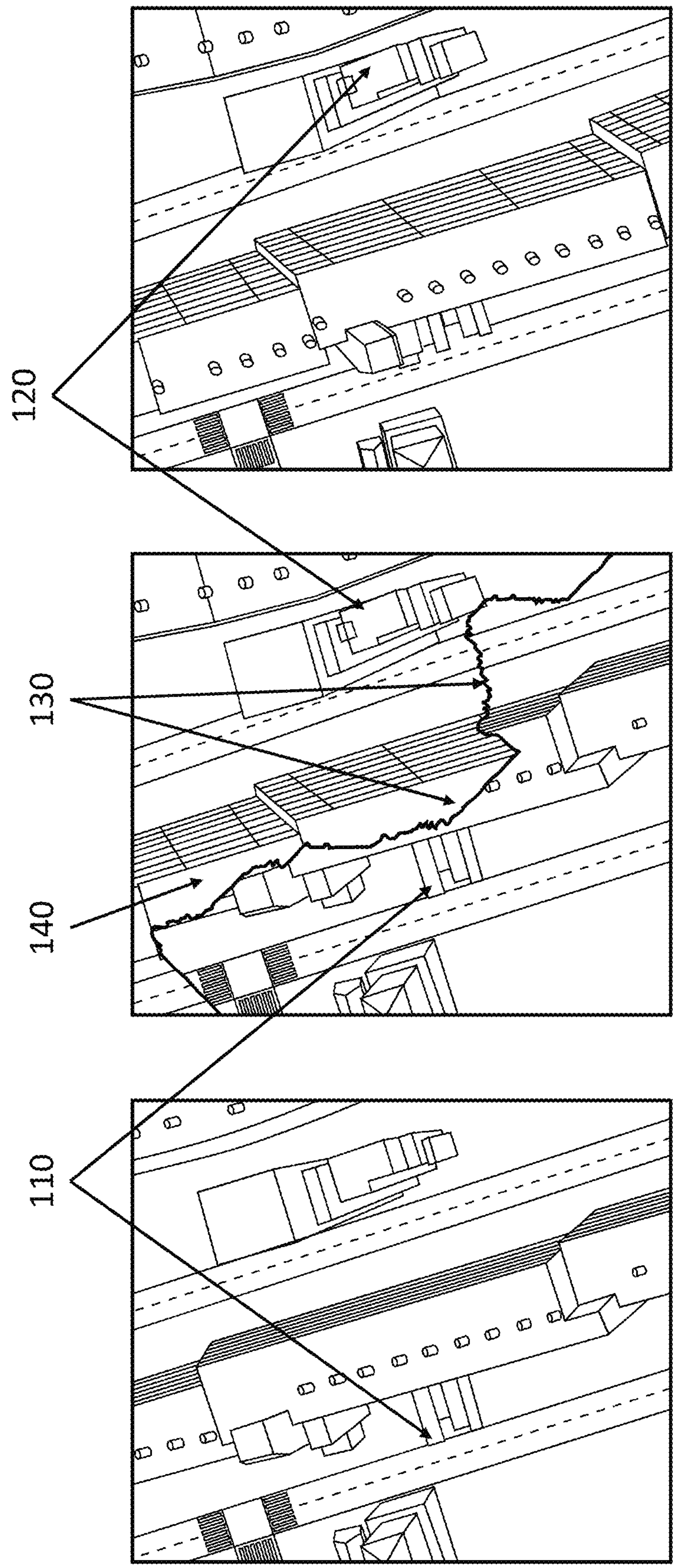
FIGS. 1A-1C are illustrations of mosaicked images with seamlines that pass through a building.

Before one or more examples of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the terminology used herein is for the purpose of description and should not be regarded as limiting.

DETAILED DESCRIPTION

Selected Definitions

For the purposes of interpreting this specification, the following definitions will apply and whenever appropriate, terms used in the singular will also include the plural and vice versa. The definitions set forth below shall supersede any conflicting definitions in any documents incorporated herein by reference.

As used herein, the singular forms "a," "an," and "the," include both singular and plural referents unless the context clearly dictates otherwise.

The terms "comprising," "comprises," and "comprised of" as used herein are synonymous with "including," "includes," or "containing," "contains," and are inclusive or open-ended and do not exclude additional, non-recited members, elements or method steps. It is appreciated that the terms "comprising," "comprises," and "comprised of" as used herein comprise the terms "consisting of," "consists," and "consists of."

The recitation of numerical ranges by endpoints includes all numbers and fractions subsumed within the respective ranges, as well as the recited endpoints.

Whereas the terms "one or more" or "at least one", such as one or more or at least one member(s) of a group of members, is clear per se, by way of further exemplification, the term encompasses inter alia a reference to any one of said members, or to any two or more of said members, such as, e.g., any ≥3, ≥4, ≥5, ≥6, or ≥7, etc. of said members, and up to all said members.

Unless otherwise defined, all terms used in the present disclosure, including technical and scientific terms, have the meaning as commonly understood by one of ordinary skill in the art to which this disclosure belongs. By means of further guidance, term definitions are included to better appreciate the teaching of the present disclosure. In the following passages, different aspects of the present disclosure are defined in more detail. Each aspect so defined may be combined with any other aspect or aspects unless clearly indicated to the contrary.

Reference throughout this specification to "one example" or "an example" means that a particular feature, structure or characteristic described in connection with the example is included in at least one example of the present disclosure. Thus, appearances of the phrases "in one example" or "in an example" in various places throughout this specification are not necessarily all referring to the same example, but may. Furthermore, the particular features, structures or characteristics may be combined in any suitable manner, as would be apparent to a person skilled in the art from this disclosure, in one or more examples. Furthermore, while some examples described herein include some, but not other features included in other examples, combinations of features of different examples are meant to be within the scope of the disclosure, and form different examples, as would be understood by those in the art. For example, in the appended claims, any of the claimed examples can be used in any combination.

In the present disclosure, reference is made to the accompanying drawings that form a part hereof, and in which are shown by way of illustration only of specific examples in which the present disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims.

Structure Avoidance

There are many applications that use large aerial images or satellite images, referred to herein as remotely sensed images or image strips or images, such as environmental monitoring, map making, and disaster management. However, the size of image strips that can be captured by a camera at one time is limited by the sensor. Therefore, remotely sensed images are usually captured with overlapping regions with each other and tiled using the overlaps to construct a large image. High resolution images of selected portions of the surface of a celestial body such as, e.g., the Earth, are desired and used by government agencies, corporations, and individuals. For instance, many consumer products in common use today include images of the Earth's surface, such as GOOGLE® Earth and other mapping products. Various types of remote sensing image collection platforms, or image capturing devices, may be used to obtain such images, including aircraft, earth-orbiting satellites, and the like.

Due to the nature of image acquisition, multiple geospatial images may be pieced together to form a geospatial mosaic (also referred to herein as a "mosaic") of a collection of geospatial images that cover a larger geographic area than may be feasibly covered with a single acquired image. The images that form such a geospatial mosaic may be acquired at different times, or may be acquired using different collection techniques, or with different collection parameters. When more than one image is available for a given region of interest on the ground, e.g., on the Earth's ground, it may be desirable to use the most recent image absent countervailing considerations such as, e.g., cloud cover, snow cover, seasonality, or other circumstance that may create undesirable image artifacts or features. Also, various artifacts can be introduced when multiple separate images are combined into a mosaic and are preferably minimized or eliminated.

Mosaics are composed of multiple images that are spliced together. The boundaries along which the images are cut and spliced together are referred to herein as the seamlines or cutlines. Current approaches for generating these seamlines typically rely only on measurements of pixel-level image similarity and typically do not account for the semantic meaning of objects within the images. As a result, the seamlines may pass though important structures or objects, such as buildings, roads and bridges. This can result in undesirable or unnatural looking seamlines.

Typical techniques for geospatial mosaic generation include manual selection of images by a human operator. Generally, the human operator is tasked with reviewing available images for an area of interest and choosing images for inclusion in the mosaic utilizing what the human operator subjectively determines to be the best, or most appropriate, source images or image strips. As may be appreciated, such human operator-centric process may be time consuming and costly. Moreover, the image selection is subjective to the human user. An example solution to the above can be found in U.S. Patent Publication No. 2021/0035265, which is incorporated herein by reference in its entirety.

Other techniques for geospatial mosaic generation include using conventional segmentation algorithms to find boundaries along which seamlines can be generated for adjacent images or image strips. These approaches rely on conventional segmentation approaches that do not use machine learning, i.e., do not learn by example, and do not perform semantic segmentation, i.e., they do not incorporation information about the meaning of the image contents. As a result, conventional segmentation algorithms do not specifically target structures such as buildings. Instead, the segmented regions represent areas with localized similarity in terms of pixel color and intensity around which seamlines may be routed. Examples of conventional segmentation algorithms include mean-shift segmentation, watershed segmentation and simple linear iterative clustering (SLIC).

Yet other techniques describe using semantic segmentation to detect structures such as buildings and subsequently generate seamlines that avoid the detected buildings. These approaches rely on semantic segmentation performed by machine learning models to label and avoid buildings, but do not incorporate, e.g., a pixelwise image similarity function, and are solely focused on avoiding buildings. Such technique is described in the publication titled "Seamline Determination Based on Semantic Segmentation for Aerial Image Mosaicking" (Saito et al., IEEE Access, Vol. 3, Dec. 17, 2015).

The machine learning model may learn to label structure and non-structure pixels through a training process that uses example images with labeled structure and non-structure pixels. In one example, the training labels may be created manually. In another example, manually created training labels might only have structure footprint pixels labeled, i.e., the location where the structure meets the ground. Due to off-nadir viewing angles, structures may appear to "lean" and, therefore, the footprint may not encompass the boundaries of the entire structure. In one example, the label pixels for the entire structure may be extrapolated by translating the footprints to rooftops and then labeling the convex hull surrounding of the combined footprints and rooftops. For example, the location of a rooftop may be extrapolated by determining the angles of the image capturing device relative to the image strips, receiving a Digital Elevation Model (DEM) that can be used to determine the height of the ground on which the structure sits and the height of the structure, and shifting the footprint to the extrapolated rooftop location. In an example, the method further includes labeling each pixel within the convex hull of the structure footprint and rooftop in order to establish the entire structure region. The modified labels containing entire structure regions may then be used to train the machine learning model.

FIGS. 1A-1C are illustrations of mosaicked images with seamlines that pass through a building. The descriptions of FIGS. 1A-1C are concurrent unless otherwise noted. FIG. 1A illustrates the bottom side of a remotely sensed image before mosaicking. FIG. 1B illustrates a seamline that passes through a building. FIG. 1C illustrates the upper side of the image before mosaicking.

As discussed above, remotely sensed images are usually captured with overlapping regions with each other and tiled using the overlaps to construct a larger image. A relevant factor when tiling the images is that the boundaries should seem to be natural, which is expressed by the fact that the boundary lines do not cross any structure or building. Buildings, also referred herein as structures, are generally higher than the Digital Terrain Model (DTM) that represents the ground elevation, and so have a different appearance in the image strips captured from different viewpoints and off-nadir angles.

With reference to FIG. 1B, when the boundary 130, referred to herein as a seamline 130, between two image strips 110 and 120 passes through a building 140, the resulting mosaic image may have an unnatural appearance where they join, as illustrated in FIG. 1B. Therefore, it may be advantageous to automatically determine optimal seamlines that do not cross buildings.

With respect to determining a seamline 130, there have been many attempts at automatic seamline determination such as, e.g., described in U.S. Pat. No. 9,858,645. One approach includes creating cost matrices from input images, and choosing pixels that pass through the minimum cost path. In this type of method, creating cost matrices may depend on hand crafted feature engineering. A simple way to define the cost matrix includes using a distance function, e.g., Euclidean distance, between the pixel values in the red-green-blue color space, which measures the pixelwise distance between the images. This type of approach implicitly assumes that objects with significant heights, e.g. tall buildings, may appear differently in an overlapping region because of the difference in viewpoint or angle of the image capturing device, so that small distances for the same pixel location may identify the pixel as a ground pixel that can be passed through by a seamline. However, if there is a large building that spans a large area in an image, the region around the center of the building may not produce such large differences because, for example, the roof may be flat or have a consistent appearance and may thus be crossed by the seamline.

As described above, there are many approaches that use various cost functions and optimization methods to determine seamlines such as the seamlines 130 illustrated in FIG. 1B. When human experts draw seamlines on overlapping regions of remotely sensed image pairs, they focus on the object type represented by the pixels in the images. Therefore, automatically detecting pixels that belong to objects which should not be crossed by a seamline is desirable, if it can be provided with high accuracy. To detect such pixels, automatic pixel labelling, namely, semantic segmentation of the remotely sensed images is advantageous.

Building Avoidance in Mosaic Seamlines Using Semantic Segmentation

In order to overcome the above-discussed challenges, the present example disclosure includes an artificial intelligence/machine learning (AI/ML) based model that detects buildings or other structures using semantic segmentation. The output from such a model may be combined with a distance-based cost function to produce seamlines that do not pass through buildings or structures, resulting in more natural-looking mosaics. This example approach may be expanded upon to include structures other than buildings, e.g., structures such as roads, cars, rivers, lakes, and the like. Examples of the disclosure incorporate both a pixel-level similarity-based cost function, also referred to herein as a "distance cost," and a machine learning based segmentation model outputs, also referred to herein as "segmentation cost," in order to create seamlines that are natural looking throughout the mosaic while also avoiding buildings and other structures. Approaches that have been described in prior art generally do not combine both approaches or else use conventional segmentation approaches that are not machine learning based and do not specifically target buildings or other structures.

Figure 2:
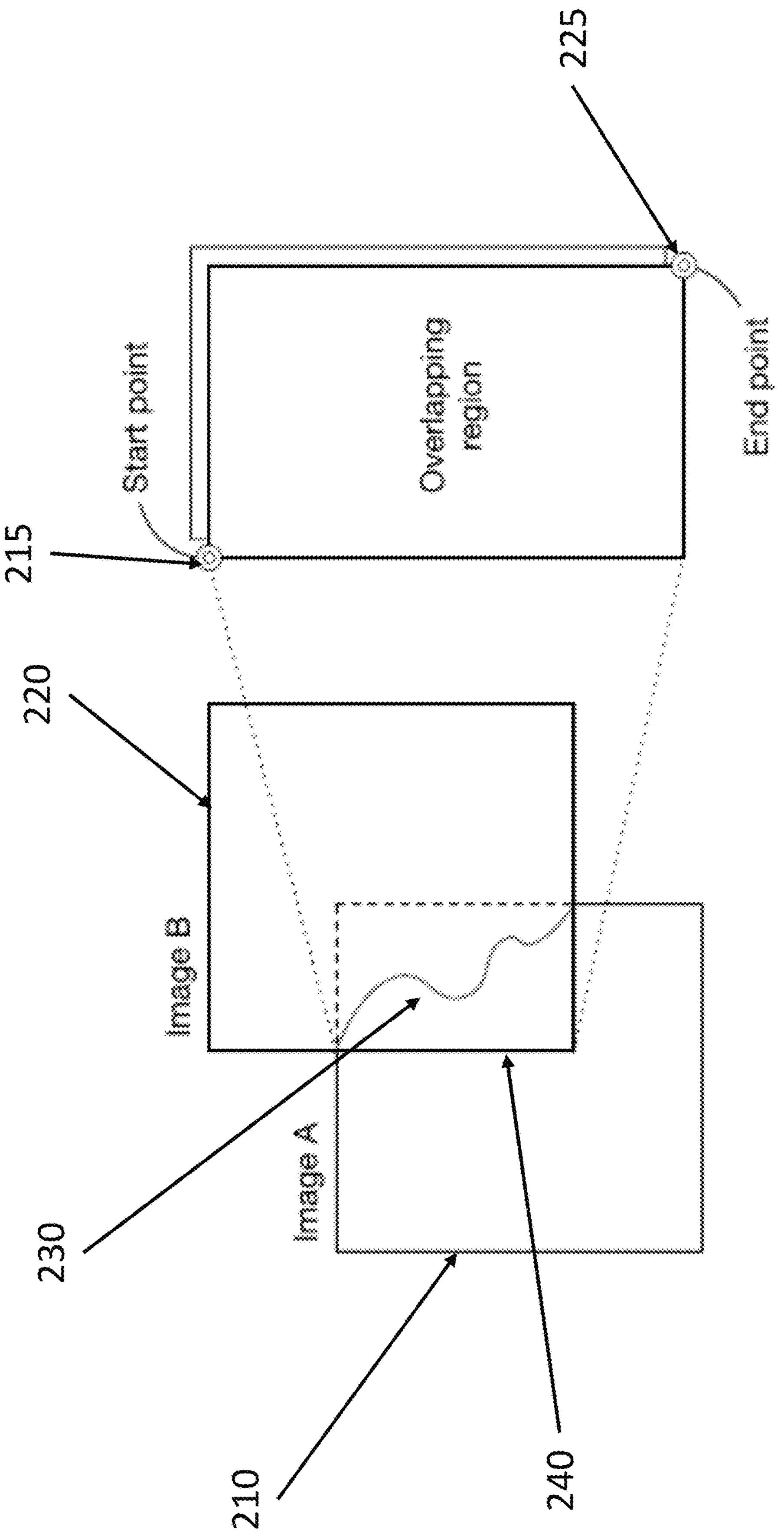
FIG. 2 illustrates an overlapping region between two image strips and start/end points for finding a desired seamline.

FIG. 2 illustrates an overlapping region between two remotely sensed images 210 and 220 and start/end points 215 and 225, respectively, for finding a desired seamline 230. In FIG. 2, once the two remotely sensed images 210 and 220 are obtained or received, the overlapping region 240 may be found, and the start/end points 210 and 220 of seamline 230 may be determined as the crossing points of the two images 210 and 220. Accordingly, an example objective of this disclosure may include finding a minimum or desired cost path between the start point 215 and the end point 225 inside of the overlapping region 240.

Methods for detecting buildings or other structures are based on the results of semantic segmentation that considers the meaning of pixels within the context of the image. Such methods may include using a machine learning algorithm such as, e.g., a Convolutional Neural Network (CNN), e.g., U-Net, or other type of artificial neural network architecture or other machine learning algorithm, to generate a matrix of building or structure probabilities or scores that indicates which pixels in the images are likely to belong to buildings or other structures, and which pixels are not. The machine learning algorithm may be trained on a dataset including a number of images, and corresponding labeled building mask images. Once the machine learning algorithm is trained, it may no longer be necessary to select parameters to perform semantic segmentation on an image when using the trained machine learning algorithm.

Figure 3A:
FIGS. 3A-D illustrate an example of a distance cost matrix and structure cost matrix for a pair of overlapping images, in accordance with various examples of the disclosure.
Figure 3B:
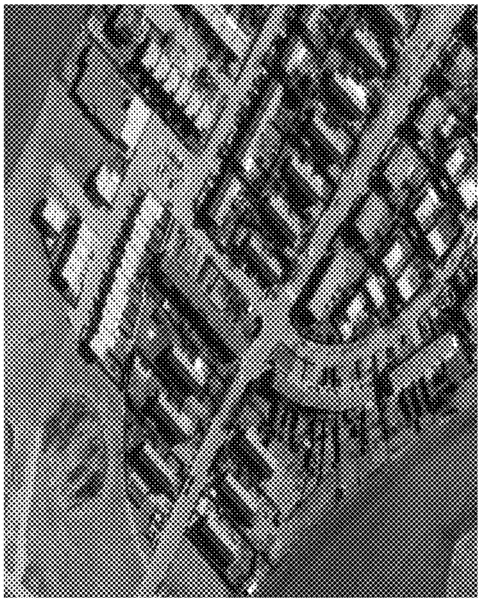
Figure 3C:
Figure 3D:
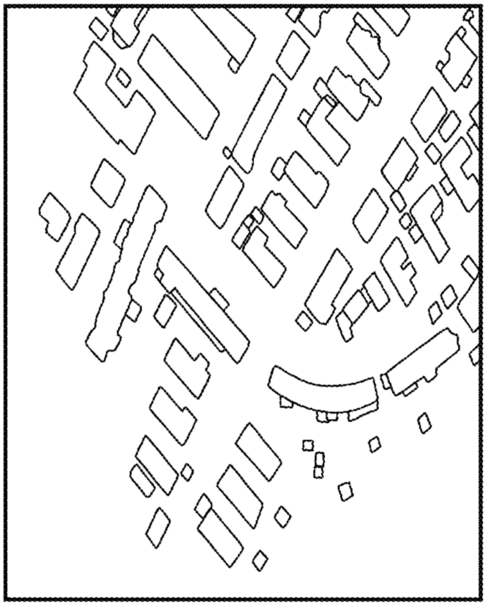

FIGS. 3A and 3B illustrate two images of the same location which, for example, constitute input images. FIG. 3C shows an example of a resulting image distance cost matrix generated using a pixelwise distance function. FIG. 3D illustrates an example of a building structure cost matrix generated using a machine learning model for semantic segmentation. In various examples, in order to perform semantic segmentation, the machine learning model may be trained to obtain a mapping from raw pixel values in an image by preparing a data set that includes, e.g., remotely sensed images and corresponding building label images. The building labels may be binary and may have a label of "1" for a pixel that belongs to the building or structure and a label of "0" for a background pixel. The machine learning model can produce a predicted building probability or cost matrix from a raw image input.

Figure 4:
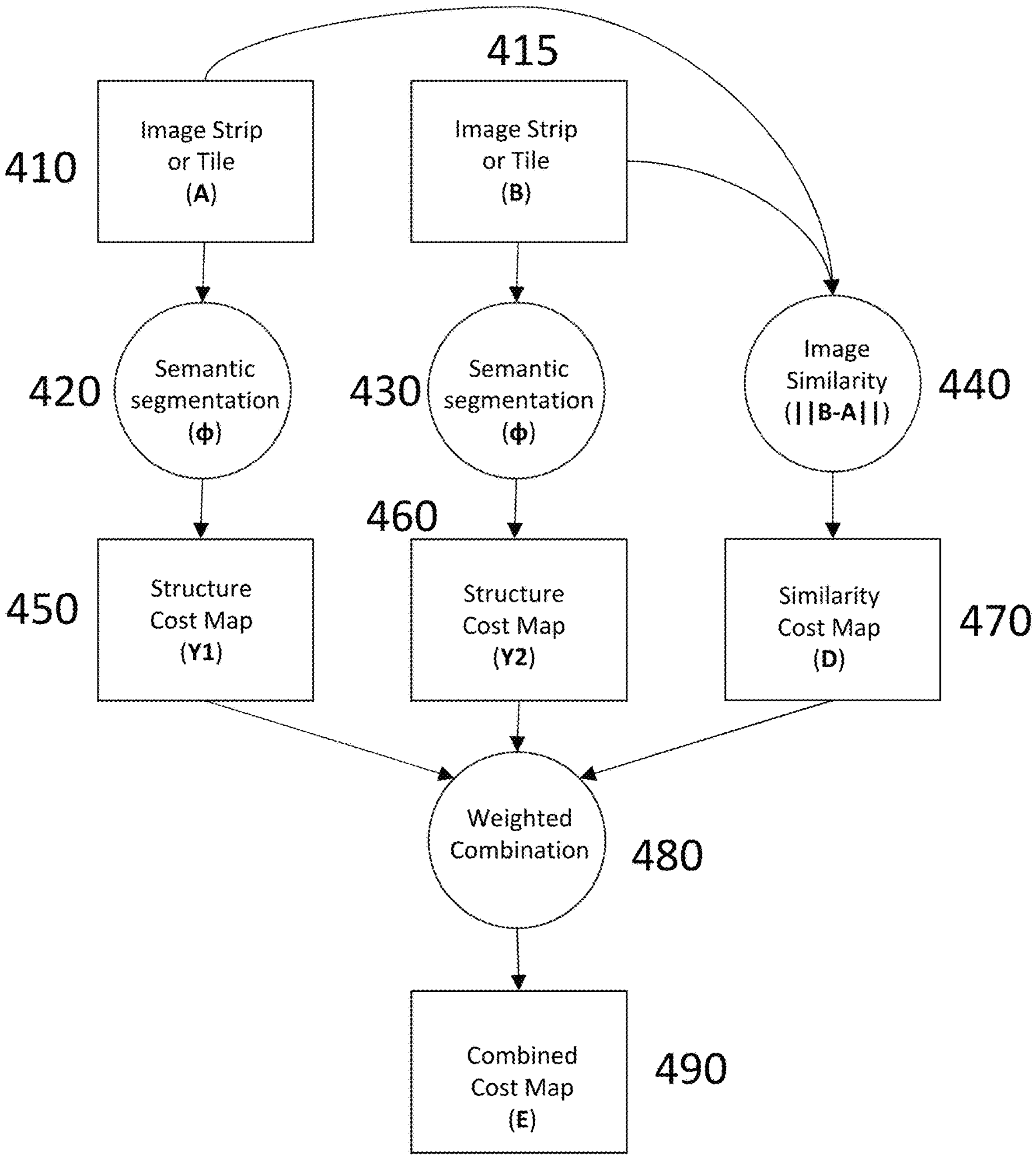
FIG. 4 is a flow chart illustrating a method for producing a combined cost matrix that incorporates both a distance cost matrix and structure cost matrices from a pair of overlapping images and a machine learning model, in accordance with various examples of the disclosure.

FIG. 4 is a flow chart illustrating a method for producing a combined cost matrix that incorporates both a distance cost matrix and a segmentation cost matrix from a pair of overlapping images, in accordance with various examples of the disclosure. For example, FIG. 4 illustrates the process of generating a combined cost matrix from two input images by using both the distance cost matrix and predictions from a semantic segmentation model. Starting from an image strip or tile 410 in a first image, referred to herein as "Image (A)," and an image strip or tile 415 in a second image, referred to herein as "Image (B)," the process continues to operations 420 and 430. During operation 420, semantic segmentation of Image (A) is performed, and during operation 430, semantic segmentation of "Image (B)" is performed. Semantic segmentation is illustrated in FIG. 3D discussed above.

During operation 440, a distance cost function between Image (A) and Image (B) is applied. For example, operation 440 includes determining the image similarity by calculating Equation (1) below, which denotes the pixelwise distance between the two images representing an overlapping region as "A" and "B" which are both arrays with shape "c×h×w", where "c" is the number of colors or channels (such as, e.g., red, green and blue), "h" is the height of the overlapping region in pixels, and "w" is the width of the overlapping region in pixels. Accordingly, a pixelwise distance cost matrix for determining seamlines may be computed during operation 470 by the following Equation (1):

$$D = \|B - A\| \tag{1}$$

In Equation (1), "D" has a shape "h×w" and represents a pixelwise distance cost function, e.g., a Euclidean distance function. Operation 450 includes determining a structure cost matrix Y1 for Image (A), and operation 460 includes determining a structure cost matrix Y2 for Image (B). The output of the deep artificial neural network for detecting structures using semantic segmentation may then be described as:

$$Y_1 = \Phi(A) \tag{2}$$

$$Y_2 = \Phi(B) \tag{3}$$

In Equations (2) and (3), "Φ" denotes evaluating the semantic segmentation network, where "Y" ("$Y_1$" and "$Y_2$") has the shape "h×w" and denotes the pixelwise structure cost matrix generated by the network that predict the presence of buildings or structures. These scores may be or include probabilities in the range of [0, 1] or other positive-valued scores where higher values indicate that the corresponding pixel is likely to belong to a building or other structure, and values near zero indicate that a pixel likely does not belong to a building or other structure. Operation 480 incorporates both the distance cost matrix and the structure cost matrix from the pair of overlapping images model, and express the final cost function as in Equation (4) below:

$$E = D + \lambda(Y_1 + Y_2) + \epsilon \tag{4}$$

In Equation (4), "λ" is a constant weighting term that indicates the advantage or importance of avoiding structures or buildings, and "E" is a constant term that penalizes the length of the seamline. In various examples, the value of "A" is tunable, where large positive values indicate that structure or building avoidance is highly desirable, and values near zero indicate that structure or building avoidance is only slightly desirable. The value of "E" may also be tunable where large positive values indicate that shorter seamlines are desirable and values near zero indicate that longer seamlines are acceptable.

During operation 490, the seamline between the two overlapping images is then found by finding a path that minimizes the sum of values of "E" Through the pixels in the overlapping region from the endpoints 215 to 225. This may be accomplished by using minimum-cost-path algorithms such as, e.g., Dijkstra's algorithm, a graph-cut algorithm, or other similar minimization algorithm. Accordingly, the cost path through "E" includes both the distance cost matrix "D" and the structure cost matrix "$\lambda(Y_1+Y_2)$" as well as a distance penalty component "ϵ". As such, the low-cost path, or the minimal cost path, is the path that corresponds to a low value, or to a minimum cost path through "E".

Figure 5B:
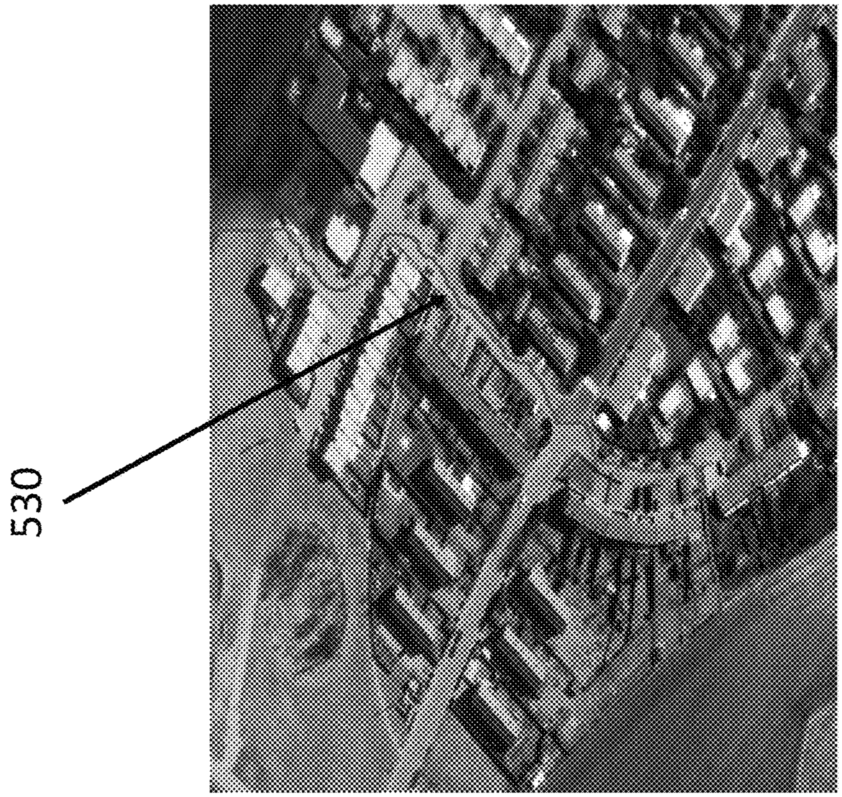
FIGS. 5A and 5B illustrate an example of a combined cost matrix and the resulting seamline and mosaicked image, in accordance with various examples of the disclosure.
Figure 5A:
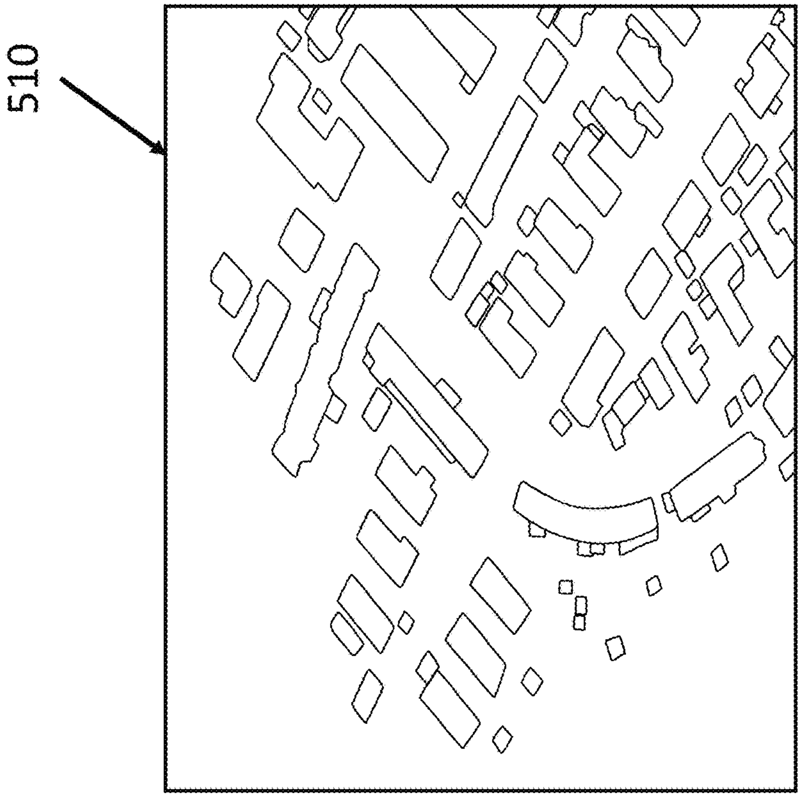

FIGS. 5A and 5B illustrate an example of a combined cost matrix and the resulting seamline and mosaicked image, in accordance with various examples of the disclosure. In various examples, referring back to FIG. 2, two structure cost matrices may be created from the overlapping region 230 from Image A labeled as 210 and Image B labeled as 220 using the trained machine learning model. The two structure cost matrices may be combined by adding them to create a single cost matrix, as illustrated in FIG. 5A as cost matrix 510. A pixel in the integrated cost matrix 510 may have a large value when the location thereof is considered to belong to a building or structure from the viewpoint of both input images such as, e.g., images "A" and "B" of FIG. 2. The integrated cost map 510 may also be integrated into a graph that treats each pixel as a node.

FIG. 5A illustrates a combined cost map and FIG. 5B illustrates a building-avoiding seamline 530 generated in accordance with various examples of the disclosure. In order to evaluate the quality of seamlines, the resulting seamlines are projected onto the original remotely sensed images. As discussed above, seamlines may also be projected on structures other than buildings, e.g., structures such as roads, cars, rivers, lakes, and the like. As illustrated in FIG. 5B, none of the seamlines 530 determined as discussed herein pass through any building or structure.

Figure 6:
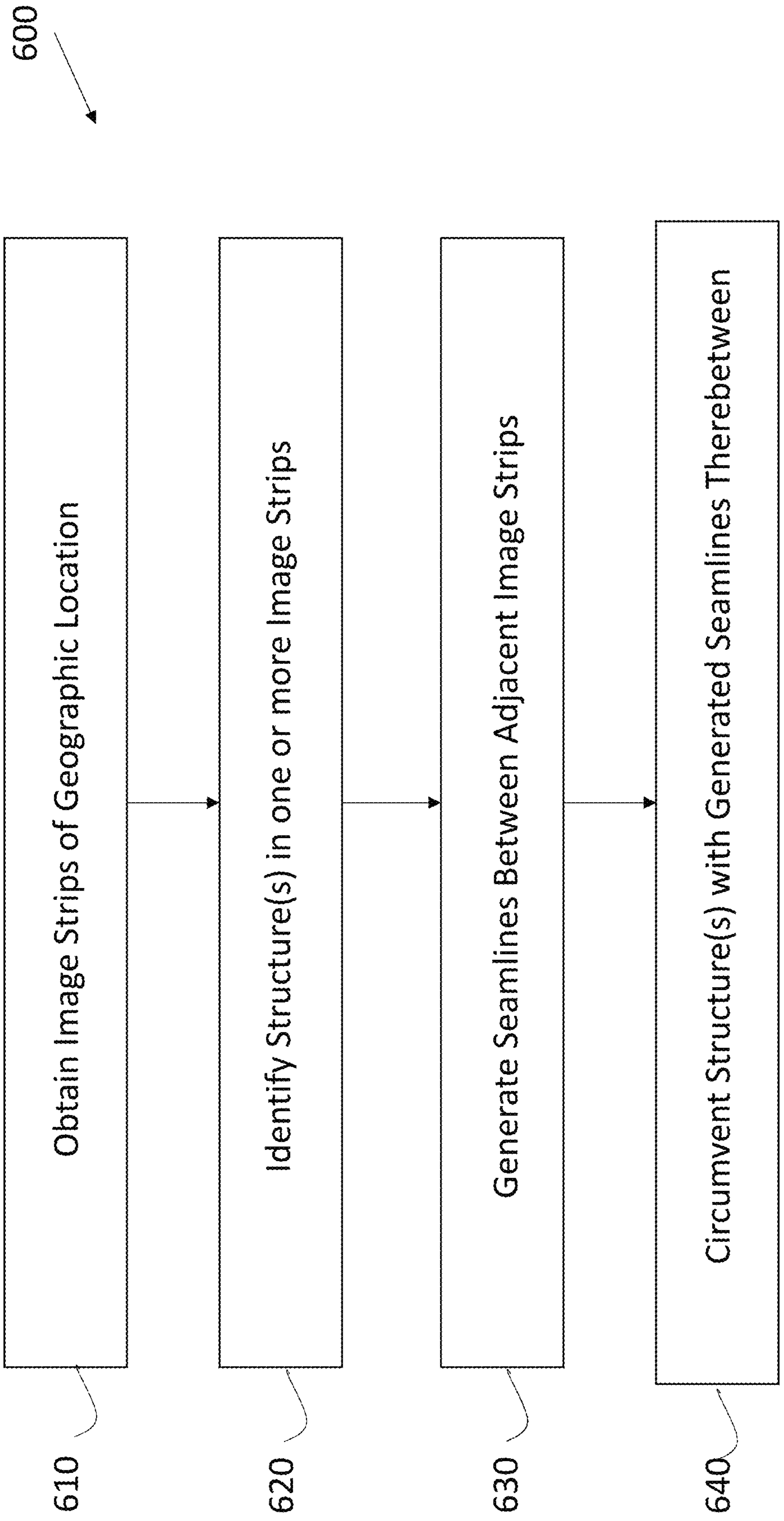
FIG. 6 is a flowchart illustrating a method for generating building-avoiding seamlines in image strips using a machine learning model, in accordance with various examples of the disclosure.

FIG. 6 represents a flowchart illustrating a method for generating building-avoiding seamlines in image strips using a machine learning model and combined cost map, in accordance with various examples of the disclosure. In FIG. 6, the method 600 includes operation 610, during which a plurality of image strips of a given geographic location are obtained. The image strips may be, e.g., images taken from high altitude via an image capturing device such as a plane or a satellite, or may be images usable for, e.g., forming a map. In operation 620, the method 600 includes identifying one or more structures that are present in one or more image strips. For example, a structure may be a building that is photographed or captured in two adjacent image strips. In another example, the one or more structures may be or include a building, a bridge, a road, or a body of water. In some examples, the one or more structures are common to one or more image strips.

Cost Functions

Operation 630 includes generating seamlines between the adjacent image strips using a machine learning model. For example, the seamlines between the image strips may be utilized to join adjacent image strips so as to form a complete image, or mosaic, of the geographic location. In an example, the generated one or more seamlines form a visual connection between the adjacent image strips. In another example, generating the one or more seamlines may include labeling each pixel of the adjacent image strips as structure pixels and non-structure pixels, and identifying a pixel in an image strip that is similar to a pixel in the adjacent image strip, for example, by using a deep learning model. As an example, the deep learning model may be or include a CNN, a U-Net architecture, or another architecture that learns to perform pixelwise semantic segmentation. Identifying similar pixels may include computing a cost matrix between the adjacent image strips in an area of overlap of the adjacent image strips and generating a combined cost matrix as a result of the cost function. For example, computing the cost matrix includes evaluating a cost function, such as a pixelwise distance score between the adjacent image strips in RGB (Red/Green/Blue) color space. In other examples, computing the cost matrix includes evaluating a distance score in an alternate color-space, such as grayscale or LAB (Lightness, Red/Green value and Blue/Yellow value) color space. As referred to herein, the cost function is the operation that is used to compute the cost matrix.

In a further example, a machine learning model performs pixelwise semantic segmentation to identify structures, such as buildings, roads, bridges, trees or bodies of water, which can be incorporated into the cost matrix. In this example, computing the cost matrix includes computing a distance-based cost matrix for the pixels of adjacent image strips in the area of overlap, computing a structure cost matrix using a machine learning model, forming a weighted combination of the distance cost matrix and the structure cost matrix to generate a combined cost matrix. The seamline may then be generated by finding a path through the images that minimizes the cost along the seamline in the combined cost matrix.

In an example, generating the combined cost matrix may include generating a combined cost map from the two images by using both the distance cost matrix and predictions from the semantic segmentation model. Identifying similar pixels may also include determining a desired cost path based on the computed cost matrix and generating a seamline by blending the adjacent image strips along the desired cost path. In another example, determining the desired cost path may include determining a minimum cost path.

In various examples, computing the cost matrix may include computing a pixelwise distance score between the adjacent image strips. For example, computing the cost matrix includes determining a distance score between pixels of adjacent image strips in the area of overlap, determining a structure score, combining the distance cost matrix and the structure cost matrix to generate a combined cost matrix, and selecting the pixels of adjacent image strips having a lowest combined score along a path. In an example, the lower cost path includes, or is formed of, the selected pixels. For example, determining the distance between the pixels includes determining a difference in color and a difference in intensity between the pixels, and the distance is based on the color difference and the intensity difference between the pixels. For example, determining the distance between the pixels includes determining the distance for each of green pixels, red pixels and blue pixels of the adjacent image strips. For example, if a pixel in one image has red, green and blue components denoted as $r_1$, $g_1$, $b_1$, respectively, and another image has red, green and blue components, $r_2$, $g_2$, $b_2$, then the Euclidean distance between these pixels may be defined according to Equation (5) below:

$$\|[r_2, g_2, b_2] - [r_1, g_1, b_1]\|^2 = \sqrt{(r_2 - r_1)^2 + (g_2 - g_1)^2 + (b_2 - b_1)^2} \quad (5)$$

Other distance metrics, such as Manhattan distance may also be used and other color space representations may also be used, such as the LAB color space or the YUV (Luma (brightness), Blue Projection and Red Projection) color space.

Operation 640 includes, when two or more adjacent strips include one or more structures, circumventing the one or more structures with the generated seamlines therebetween. During operation 640, the seamlines generated during operation 630 circumvent, or are drawn around a contour, of a structure. In various examples, operation 640 further includes forming an image mosaic of the geographic location by blending the plurality of image strips at the generated one or more seamlines.

Correcting for Off-Nadir Viewing Angles

A process for correcting structures for off-nadir viewing angles includes shifting the footprint labels to the rooftop and then filling in the combined convex hull model, in accordance with various examples of the disclosure. The device capturing remotely sensed imagery may be pointed at varying angles, referred to as "off-nadir angle." This can result in structures having the appearance of lean. In one example, the example imagery used to train a deep learning model for semantic segmentation of structures may only have the structure footprints labeled, i.e., the location where the structure meets the ground. Since it is important that seamlines do not cross any portion of the building, it is advantageous to correct for structure lean due to off-nadir viewing angles.

In one example, lean due to off-nadir viewing angle can be corrected by extrapolating the location of the structure rooftops, translating the footprints to rooftops and then labeling the convex hull surrounding the combined footprints and rooftops. For example, the location of a rooftop, may be extrapolated by determining the angles of the image capturing device relative to the image strips, receiving a DEM that can be used to determine the height of the ground on which the structure sits and the height of the structure, and shifting the footprint to the extrapolated rooftop location. Each pixel within the convex hull of both the footprint and rooftop can then be labeled as structure pixels. In one example, the deep learning model can then be trained on example images with this correction in order to improve the detection of structure pixels in the presence of off-nadir viewing angles. In another example, this correction can be applied to the structure cost matrix generated by a machine learning model trained on uncorrected labels.

Although various examples are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for avoiding building structures using semantic segmentation, the method comprising:

correcting training labels of a machine learning model for off-nadir angle by:

extrapolating a location of a rooftop of a structure in a training image based on a location of a footprint of the structure and metadata of the training image;

defining a contour of the structure from the footprint to the rooftop thereof; and labeling each pixel within the defined contour as a structure pixel;

training the machine learning model based at least in part on the corrected training labels;

obtaining a plurality of image strips of a geographic location;

labeling, using semantic segmentation, by the machine learning model, each pixel of the plurality of image strips as either a structure pixel or a non-structure pixel for one or more structures in the plurality of image strips;

generating one or more seamlines between adjacent ones of the plurality of image strips, by:

creating the one or more seamlines based on similarity between pixels in the adjacent ones of the plurality of image strips, while circumventing the labeled structure pixels; and forming an image mosaic of the geographic location by blending the plurality of image strips at the generated one or more seamlines.

2. The method of claim 1, wherein extrapolating the location of the rooftop comprises determining a height of the rooftop by:

receiving a height, a location and an angle of an image capturing device configured to obtain the training image;

receiving a height of the structure;

receiving a height of a ground on which the structure sits; and determining the location of the rooftop based on at least one of the received height, location and angle of the training image, the received height of the structure, and the received height of the ground.

3. The method of claim 1, wherein correcting the training labels includes labeling each pixel of the training image outside of the defined contour as a non-structure pixel.

4. The method of claim 1, wherein the one or more structures comprise at least one of a building, a bridge, a road, and a body of water.

5. The method of claim 1, further comprising, prior to labeling each pixel, identifying the one or more structures that are common to the plurality of image strips.

6. A method for avoiding building structures using semantic segmentation, the method comprising:

obtaining a plurality of image strips of a geographic location;

identifying a structure that is present in any of the plurality of image strips;

labeling, using semantic segmentation, each pixel of the plurality of image strips as a structure pixel or a non-structure pixel; and identifying similarities of pixels in adjacent ones of the plurality of image strips, by:

computing a cost matrix for the adjacent ones of the plurality of image strips in an area of overlap of the adjacent ones of the plurality of image strips, by:

determining a distance score between pixels of adjacent ones of the plurality of image strips in the area of overlap;

determining a structure score;

combining the distance score and the structure score to generate a combined score; and selecting the pixels of adjacent ones of the plurality of image strips having a lower combined score; and determining a desired cost path based on the selected pixels;

generating one or more seamlines between the adjacent ones of the plurality of image strips, based on the desired cost path, while circumventing the structure based on the labeled structure pixels; and forming an image mosaic of the geographic location by blending the plurality of image strips at the generated one or more seamlines.

7. The method of claim 6, wherein the desired cost path comprises a lowest cost path.

8. The method of claim 6, wherein determining the distance score between the pixels comprises determining a difference in color and a difference in intensity between the pixels, the distance being based on the color difference and the intensity difference between the pixels.

9. The method of claim 6, wherein determining the distance score between the pixels comprises determining the distance for each of green pixels, red pixels and blue pixels of the adjacent ones of the plurality of image strips.

* * * * *